United States Patent [19]
Saitoh

[11] Patent Number: 5,634,038
[45] Date of Patent: May 27, 1997

[54] COMMON MEMORY PROTECTION SYSTEM IN A MULTIPROCESSOR CONFIGURATION USING SEMAPHORE-FLAGS STORED AT COMPLEMENTARY ADDRESSES FOR ENABLING ACCESS TO THE MEMORY

[75] Inventor: Hiroyuki Saitoh, Kawasaki, Japan

[73] Assignee: Fujitsu Limited, Kawasaki, Japan

[21] Appl. No.: 322,345

[22] Filed: Oct. 13, 1994

[30] Foreign Application Priority Data

Mar. 17, 1994 [JP] Japan ................................. 6-047484

[51] Int. Cl.⁶ ............................................. G06F 12/16
[52] U.S. Cl. ...................... 395/490; 395/481; 395/421.06
[58] Field of Search .............................. 395/490, 482, 395/306, 307, 308, 309, 886, 421.06, 481, 185.06, 185.07

[56] References Cited

U.S. PATENT DOCUMENTS 3,576,982  5/1971  Duke ................... 395/185.07
4,597,084  6/1986  Dynneson et al. ............ 371/51.1
4,975,870  12/1990  Knicely et al. .............. 395/479

FOREIGN PATENT DOCUMENTS 2-188865  7/1990  Japan .
4-361340  12/1992  Japan .

*Primary Examiner*—Eddie P. Chan
*Assistant Examiner*—Kevin L. Ellis
*Attorney, Agent, or Firm*—Staas & Halsey

[57] ABSTRACT

A common memory protection system in an apparatus having a multiprocessor configuration in which a plurality of CPUs are connected to a common RAM via a common bus, the system has a flag control section for outputting two semaphore-flag signals showing each semaphore-flag condition when the CPU checks two semaphore-flags by accessing the corresponding two semaphore-flag addresses that have complementary address values to each other, and a memory control section that allows the CPU to access any address in the common RAM via the common bus when receiving the semaphore-flag signals, both of which indicate that access to the common RAM is enabled, from the flag control section.

6 Claims, 9 Drawing Sheets

Fig.6

| No. | TABLE | SEMAPHORE 1 | SEMAPHORE 2 |
|---|---|---|---|
| 00 | △00100h～△00FFFh | △00000h | △FFFFFh |
| 01 | △01000h～△01FFFh | △00001h | △FFFFEh |
| 02 | △02000h～△02FFFh | △00002h | △FFFFDh |
| ⋮ | ⋮ | ⋮ | ⋮ |
| FE | △FE000h～△FEFFFh | △000FEh | △FFF01h |
| FF | △FF000h～△FFEFFh | △000FFh | △FFF00h |

COMMON MEMORY PROTECTION SYSTEM IN A MULTIPROCESSOR CONFIGURATION USING SEMAPHORE-FLAGS STORED AT COMPLEMENTARY ADDRESSES FOR ENABLING ACCESS TO THE MEMORY

BACKGROUND OF THE INVENTION

1. Field of the Invention

The present invention relates to a common memory protection system that is used in an apparatus having a multiprocessor configuration, and more particularly to a common memory protection system in which data stored in a common memory is prevented from being destroyed, when a faulty processor accesses the common memory.

2. Description of the Related Art

In a monitor control apparatus for radio communication, etc., which has a multiprocessor configuration, a random access memory (RAM) is used as a common memory that is accessed in common by a plurality of processors. The common RAM is used for a synchronizing operation between the processors and to store common data between them. The common RAM is periodically accessed by the processors, and thereby data stored in the RAM is rewritten.

In such an apparatus, even if a problem occurs in one operating processor, it is required that data stored in a common RAM is not destroyed when the faulty processor accesses the common RAM.

Conventionally, a semaphore-flag is used in order that when a CPU is writing data in a data area of the common RAM, other CPUs are allowed to only read data from the same data area, so that two CPUs do not simultaneously access the same data area for writing.

In the conventional use of semaphore-flags, a read-modify-write-cycle command, e.g., "TAS", "CAS", etc., is issued to execute read, write, or bit test operations of a certain address during one bus cycle. As for the hardware configuration thereof, commercial RAM is used for a predetermined amount of memory.

However, in a conventional common memory protection system, there is a problem in that if an error occurs in a part of an address bus buffer in a common bus when a CPU accesses a common RAM vir the common bus, the CPU may rewrite data to an incorrect area in the common RAM. This is because since the incorrect area accessed by the CPU is a part of an area of the common RAM, a semaphore-flag may be detected and thereby the common RAM can be accessed.

For example, it is assumed that a common RAM addresses with a 20-bit address bus (A0–A19) 00000h to FFFFFh in hexadecimal (h), and due to a problem, the output of an address line A 15 of an address buffer in a common bus is fixed to "1". In such a case, for example, if the CPU accesses 00000h, 08000h in the common RAM would actually be accessed by the CPU, and thereby, data that should not be changed may be destroyed.

In this case, there would be a problem in that it would be impossible to operate normally as a whole apparatus because of the data destroyed in the common RAM, even if CPUs other than a faulty CPU can operate normally.

SUMMARY OF THE INVENTION

To solve the above problems, in an apparatus having a multiprocessor configuration, the invention provides a common memory protection system that can prevent data stored in a common RAM from being destroyed, even if a faulty CPU accesses the common RAM.

According to the present invention, there is provided a common memory protection system in an apparatus having a multiprocessor configuration in which a plurality of CPUs are connected to a common RAM via a common bus. The system has a flag control section for outputting two semaphore-flag signals showing each semaphore-flag condition when the CPU checks two semaphore-flags by accessing the corresponding two semaphore-flag addresses that have the complementary address values to each other, and a memory control section that allows the CPU to access any address in the common RAM via the common bus when receiving the semaphore-flag signals, both of which indicate that access to the common RAM is enabled, from the flag control section.

The flag control section includes a first decoder that outputs two check signals provided by decoding the two semaphore-flag addresses that have the complementary address values to each other, and two flag storage circuits each of which outputs the semaphore-flag signal at the beginning of a reception of the check signal and indicates that access to the common RAM is enabled at the end of the reception of the check signal. The memory control section includes a second decoder that is enabled by a reception of the semaphore-flag signals, both of which indicates that access to the common RAM is enabled, from the flag control section and outputs access enable signals provided by decoding a memory address received from the CPU via the common bus, to the common RAM.

Further, according to the present invention, the common RAM is divided into a plurality of tables each of which has the two semaphore-flags accessed by the semaphore-flags addresses having the complementary address values to each other and corresponding to respective segment addresses of the tables. The flag control section includes a first decoder that outputs two check addresses provided by decoding the two semaphore-flag addresses that have the complementary address values to each other and correspond to respective segment addresses of the tables, and two flag RAMs each of which outputs the semaphore-flag signals corresponding to each table at the beginning of an input of the check address and indicates that access to each table in the common RAM is enabled, at the end of the input of the check address. The memory control section includes a second decoder that is enabled by the semaphore-flag signals, both of which indicate that access to each table in the common RAM is enabled, from the flag RAMs and outputs access enable signals to the tables in the common RAM by decoding a memory address received from the CPU via the common bus.

Furthermore, according to the present invention, the memory control section further includes a third decoder that outputs an error signal when the CPUs access the common RAM without detection of the semaphore-flag signals, both of which indicate that access to the common RAMis enabled, from the flag control section, and by reception of the error signal the CPUs activate an exception process and halt their operation. The flag control section outputs the two semaphore-flag signals further having respective specific data that have the complementary values to each other so as to check a data bus error. The system further has an alignment changing section that changes the bus alignment between the CPUs and the common RAM or I/O section when a problem occurs in the common bus.

BRIEF DESCRIPTION OF THE DRAWINGS

The present invention will be more clearly understood from the description as set forth below with reference to the accompanying drawings.

FIG. 6 is a diagram showing the relationship between table addresses and semaphore-flag addresses.

DESCRIPTION OF THE PREFERRED EMBODIMENTS

Figure 1:
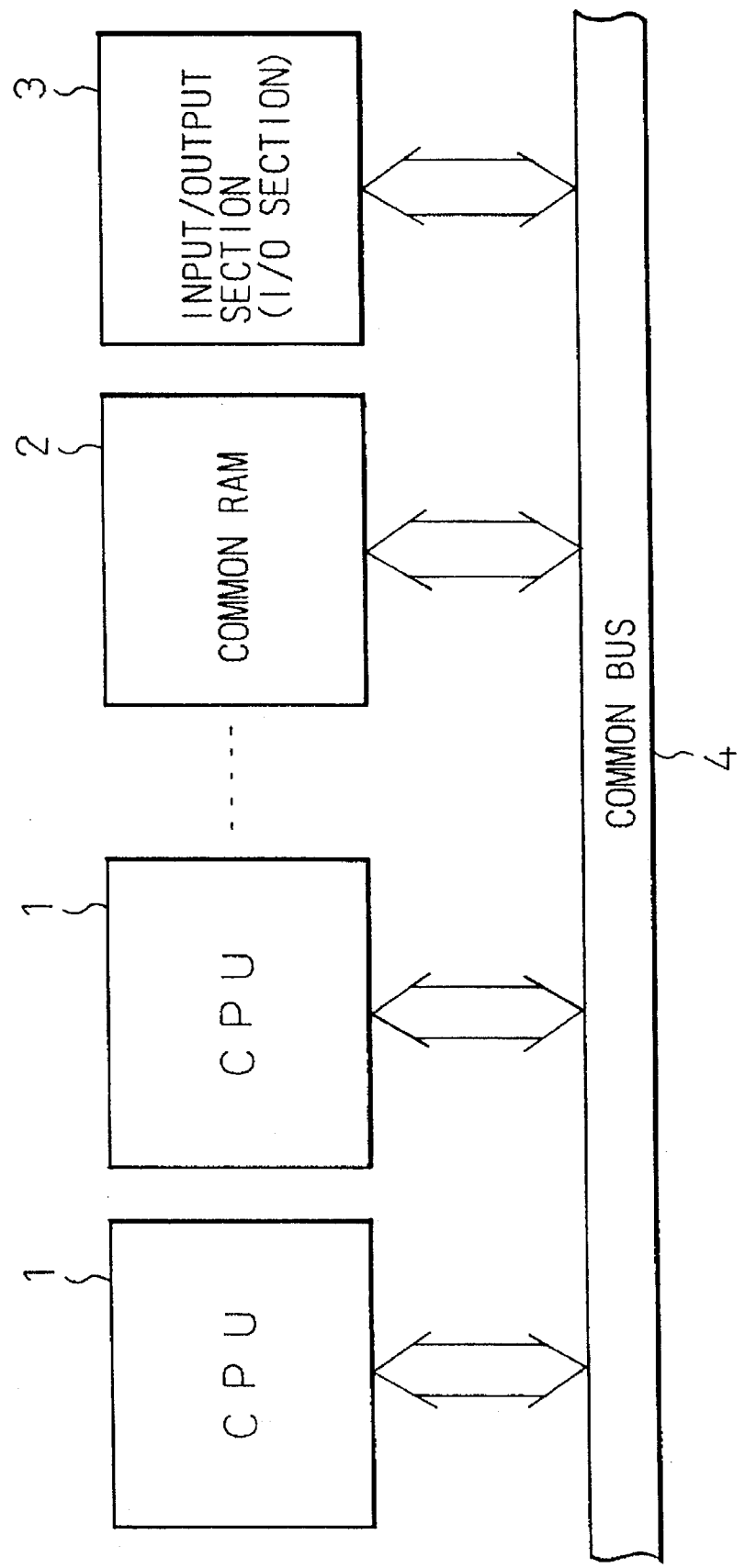
FIG. 1 is a block diagram showing an example of the conventional configuration of a multiprocessing apparatus having a common memory.

Before describing the preferred embodiments according to the present invention, examples of the related art are provided with reference to FIG. 1.

FIG. 1 shows an example of the conventional configuration of a multiprocessing apparatus, e.g., a radio communication monitor control apparatus, etc., to which the present invention is applied. Reference numeral 1 indicates a plurality of processors (CPU), reference numeral 2 indicates a common RAM, reference numeral 3 indicates an input/output (I/O) section, and reference numeral 4 indicates a common bus.

Each CPU 1 receives data from the I/O 3 or sends data to the I/O 3 via the common bus 4. Also, synchronizing data is transfered between the CPUs 1 and the common RAM 2, or common data is read from or written into the common RAM 2 by the CPUs 1 via the common bus 4.

When a plurality of the CPUs 1 simultaneously access the same data area in the common RAM 2, operation errors may occurs in the CPUs 1. Therefore, each CPU 1 must avoid conflicts when accessing the common RAM 2.

Conventionally, a semaphore-flag is used so that when a CPU 1 is writing data in a data area of the common RAM 2, another CPU 1 can be only allowed to read data from the same data area, or so that two CPUs 1 can avoid simultaneously accessing the same data area.

A method for utilizing a conventional semaphore-flag uses a read-modify-write-cycle command, e.g., "TAS" and "CAS", etc., to execute the read, write, or bit test operations of a certain address during one bus cycle. In the hardware configuration thereof, there is provided a predetermined amount of memory using a general purpose RAM.

However, in a conventional common memory protection system, there is a problem in that if an error occurs in a part of an address bus buffer when accessing a common RAM, a CPU may write data to an incorrect area of the common RAM. Because a semaphore-flag can be detected in a case that an area to be accessed by the CPU exists within the common RAM area, even if a truth address to the common RAM cannot be outputted by the error.

For example, it is assumed that a common RAM 2 area in a memory with a 20-bit address bus (A0–A19) is assigned the addresses from 00000h to FFFFFh, and due to an error, the output of an address bus buffer line A 15 of the CPU 1 is fixed to "1". In such a case, if the CPU 1 accesses addresses from 00000h, the addresses from 08000h in the common RAM 2 would actually be accessed by the CPU 1. Therefore, data that should not be changed may be destroyed. In this case, there would be a problem in that it would be impossible to operate normally as a whole apparatus because of the data destroyed in the common RAM 2, even if CPUs 1 other than a faulty CPU 1 can operate normally.

In the following, preferred embodiments of a common memory protection system according to the present invention are explained with reference to FIGS. 2 to 9.

Figure 2:
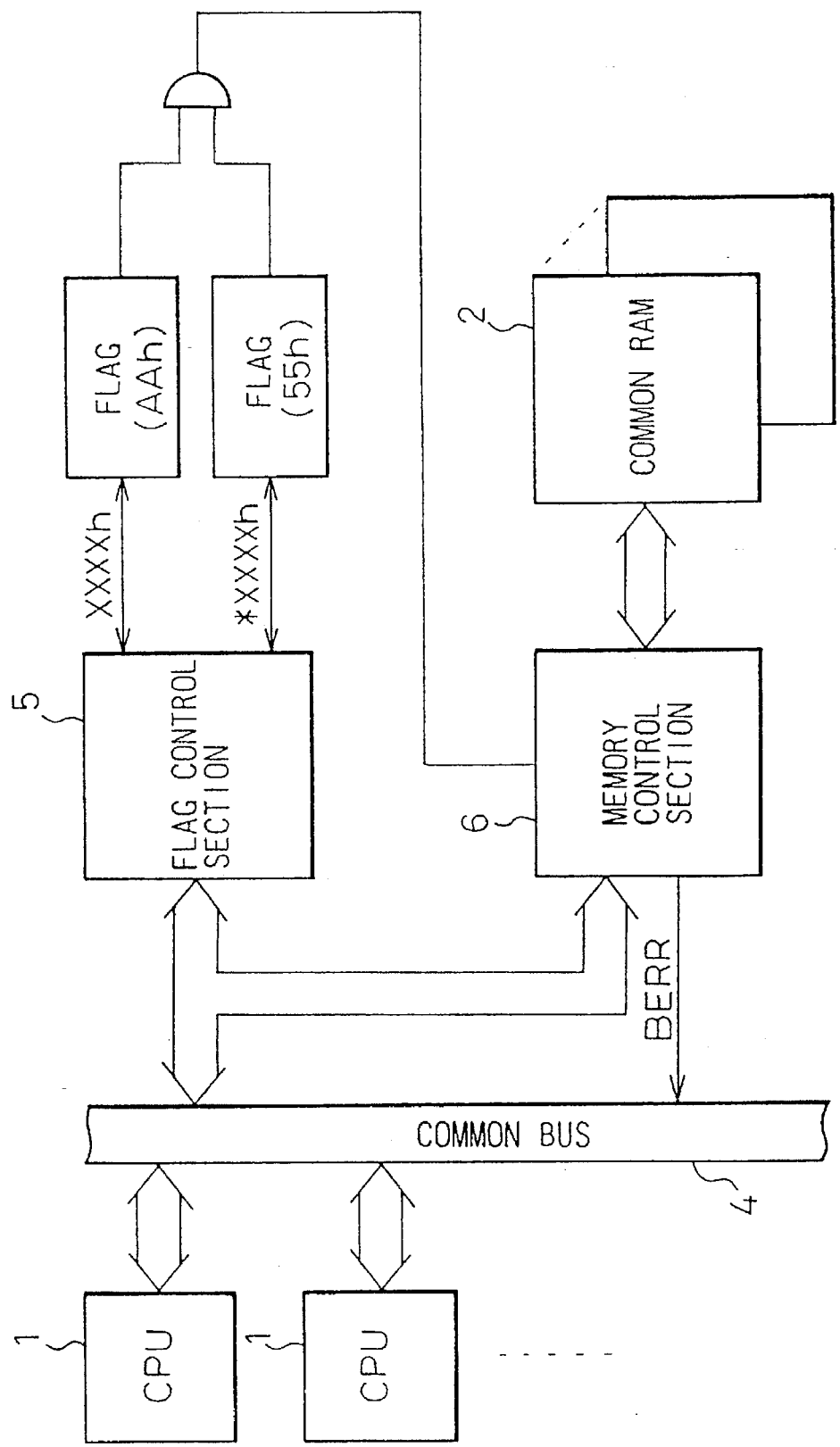
FIG. 2 is a block diagram showing the basic configuration a common memory protection system according to the present invention.

FIG. 2 is a block diagram showing the basic configuration of a commom memory protection system according to the present invention. In the figure, a flag control section 5 controls the management of semaphore-flags accessed by an address X X X X X h and a complementary address * X X X X X h (in the following, "*" indicates the inversion of each bit of an address or a control signal). Namely, when the address X X X X X h and the complementary address * X X X X X h are provided to the flag control section 5 via the common bus 4, the flag control section 5 detects semaphore-flag signals. Note that two semaphore-flag configurations exist in the present invention. One only involves semaphore data, and the other involves semaphore data and specific data that is added to the semaphore data. For example, FIG. 2 shows AAh and the complementary value 55h as the values of semaphore-flag signals that correspond to the latter case. By detecting both flags AAh and 55h, the memory control section 6 is enabled. Conversely, if both flags are not detected, the memory control section 6 is disabled.

If the memory control section 6 is enabled by the flag control section 5, the memory control section 6 allows the CPU 1 to access any address in the common RAM 2 via the common bus 4. Conversely, if both flags cannot be detected, the memory control section 6 inhibits access to the common RAM 2. When the CPU 1 accesses the common RAM 2 in the latter case, the memory control section 6 sends a bus error signal (BERR) to the CPU 1 via the common bus 4.

When reading both flags, the CPU 1 checks semaphore data. For example, the flag values are provided as X 1010101b and X 0101010b ("X" indicates semaphore data and the other bits indicate specific data). When the semaphore data indicates access is enabled and the specific data coincide with the above values, the CPU 1 judges that the data bus is operating normally and starts accessing the common RAM 2.

Figure 3:
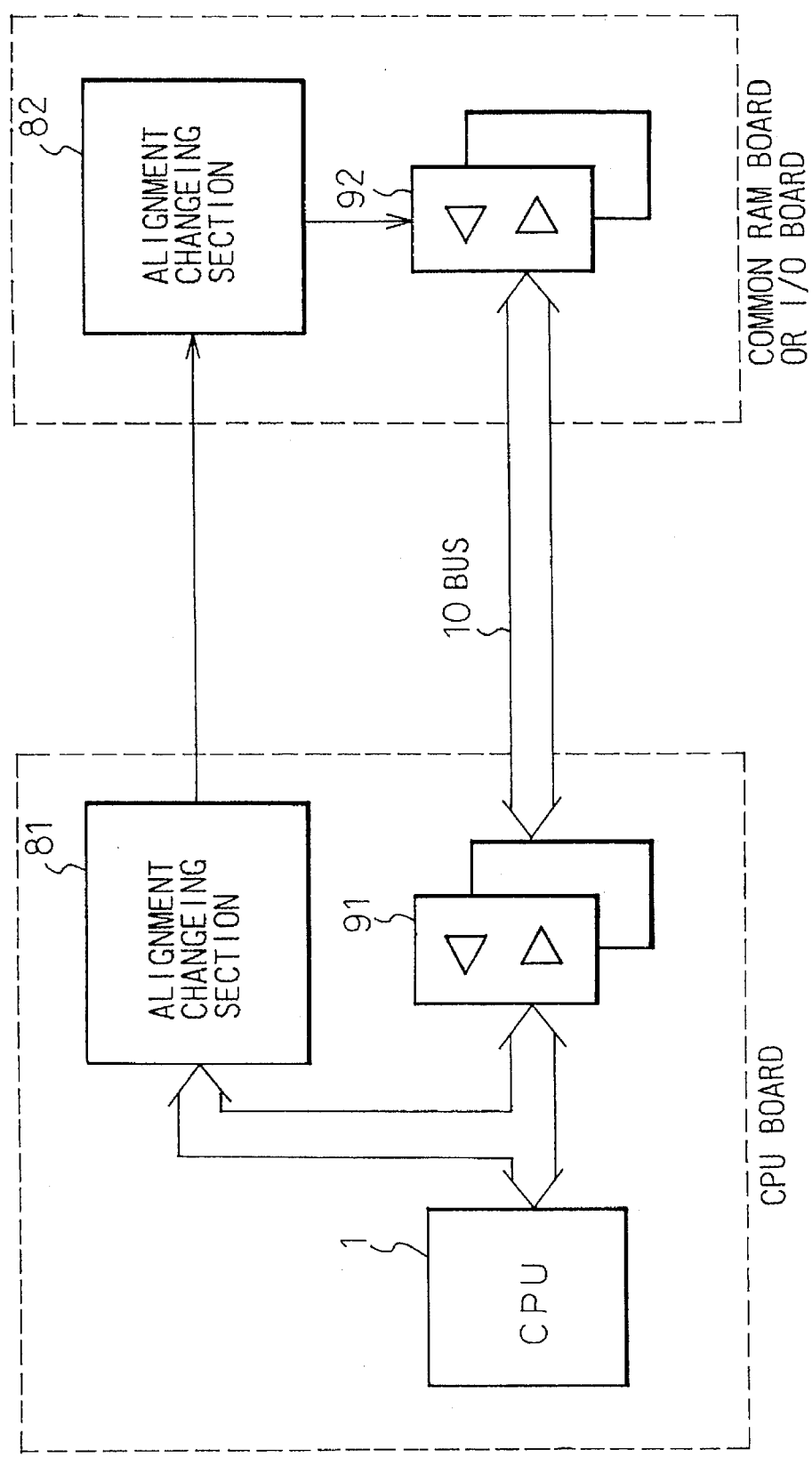
FIG. 3 is a block diagram showing another basic configuration of a common memory protection system according to the present invention.

FIG. 3 is a block diagram showing another basic configuration of a commom memory protection system according to the present invention. The alignment changing section $8_1$ is mounted on a CPU board having the CPU 1 and connects or disconnects a path between the CPU 1 and the bus 10 by controlling the buffer circuit $9_1$. The alignment changing section 82 is mounted on a common RAM board having a common RAM or an I/O board having an I/O section and connects or disconnects a path between the common RAM or the I/O section and the bus 10 by controlling the buffer circuit $9_2$.

When an error occurs in the bus 10, the CPU 1 controls the alignment changing sections $8_1$ and $8_2$ so that the faulty bus 10 is disconnected.

To realize the operations described above, there is provided the following configuration.

(1) In the present invention, a common memory protection system in an apparatus having a multiprocessor configuration in which a plurality of CPUs 1 are connected to a common RAM 2 via a common bus 4, the system comprises: a flag control section 5 for outputting two semaphore-flag signals showing each semaphore-flag condition when the CPU 1 checks two semaphore-flags by accessing the corresponding two semaphore-flag addresses that have a complementary address values to each other; and a memory control section 6 that allows the CPU 1 to access any address in the common RAM 2 via the common bus 4 when receiving the semaphore-flag signals, both of which indicate that access to the common RAM 2 is enabled, from the flag control section 5.

(2) In the above case (1), the flag control section 5 includes a first decoder 11 that outputs two check signals provided by decoding the two semaphore-flag addresses that have complementary address values to each other, and two flag storage circuits 13 and 14 each of which outputs a semaphore-flag signal at the beginning of a reception of the check signal and indicates that access to the common RAM is enabled at the end of the reception of the check signal. The memory control section 6 includes a second decoder 12 that is enabled by a reception of the semaphore-flag signals, both of which indicate that access to the common RAM is enabled, from the flag control section 5 and outputs access enable signals provided by decoding a memory address received from the CPU 1 via the common bus 4 to the common RAM 2.

(3) In the above case (1), the common RAM 2 is divided into a plurality of tables each of which has the two semaphore-flags accessed by the semaphore-flags addresses having complementary address values to each other and corresponding to respective segment addresses of the tables. The flag control section 5 includes a first decoder 11 that outputs two check addresses provided by decoding the two semaphore-flag addresses that have complementary address values to each other and correspond to respective segment addresses of the tables, and two flag RAMs 26 and 27 each of which outputs the semaphore-flag signals corresponding to each table at the beginning of an input of the check address and indicates that access to each table in the common RAM 2 is enabled at the end of the input of the check address. The memory control section 6 includes a second decoder 12 that is enabled by the semaphore-flag signals, both of which indicate that access to each table in the common RAM 2 is enabled, from the flag RAMs 26 and 27 and outputs access enable signals to the tables in the common RAM 2 by decoding a memory address received from the CPU 1 via the common bus 4.

(4) In the above case (1), the memory control section 6 further includes a third decoder 32 that outputs an error signal when the CPUs 1 access the common RAM 2 without detection of the semaphore-flag signals, both of which indicate that access to each table in the common RAM 2 is enabled, from the flag control section 5, and by a reception of the error signal the CPUs 1 activate an exception process and halt their operation.

(5) In the above case (1), the flag control section 5 outputs the two semaphore-flag signals further having respective specific data that have complementary values to each other so as to check for a data bus error.

(6) In the above case (5), the system further has alignment changing sections $8_1$ and $8_2$ that change the bus alignment between the CPUs 1 and the common RAM 2 or I/O section 3 when an error occurs in the common bus.

In the present invention, in order to avoid the access conflict between CPUs 1 when accessing a common RAM 2 via a common bus 4, the flag control section 5 checks semaphore-flags by accessing the address X X X X X h and a complementary address * X X X X X h. If both semaphore flags indicate that access is enabled, the memory control section 6 allows the CPU 1 to access the common RAM 2 via the common bus 4, and both semaphore-flags are rewritten. Namely, at the time a CPU 1 reads semaphore-flags, if each value of the semaphore data bit in a semaphore-flag is "0", which allows the CPU 1 to access the common RAM 2, the value of the semaphore data bit is set to "1". If two values of the semaphore data bit in a semaphore-flags are both set to "11", the memory control section 6 is enabled. Otherwise, the memory control section 6 remains disabled.

The addresses for accessing two semaphore-flags have complementary address values to each other as described above. Therefore, even if an error occurs in an address bus buffer on a CPU board, for example any address bit of the address bus buffer is fixed, both semaphore-flags aren't set to "11" because both are accessed by the complementary address as described above. Accordingly, the memory control section 6 is disabled, so even if the CPU 1 intends to write data in the common RAM 2, data stored in the common RAM 2 cannot be destroyed. Also, when such an error occurs, the CPU 1 receives a bus error signal (BERR) from the memory control section 6 via the common bus 4. Therefore, the CPU 1 can recognize the error and execute the corresponding error process.

Further, for example, the output values of semaphore-flags are changed as 01010101b→11010101b and 00101010b→10101010b. Therefore, even if some data bits are set to fixed values due to a data bus error, the CPU 1 cannot detect the above two bit sequences having complementary bit values to each other, and thereby the CPU 1 recognizes the data bus error and executes the corresponding error process.

Furthermore, the present invention can disconnect a faulty bus by providing alignment data to the alignment changing sections $8_1$ and $8_2$, and return the bus operation to normal.

Figure 4:
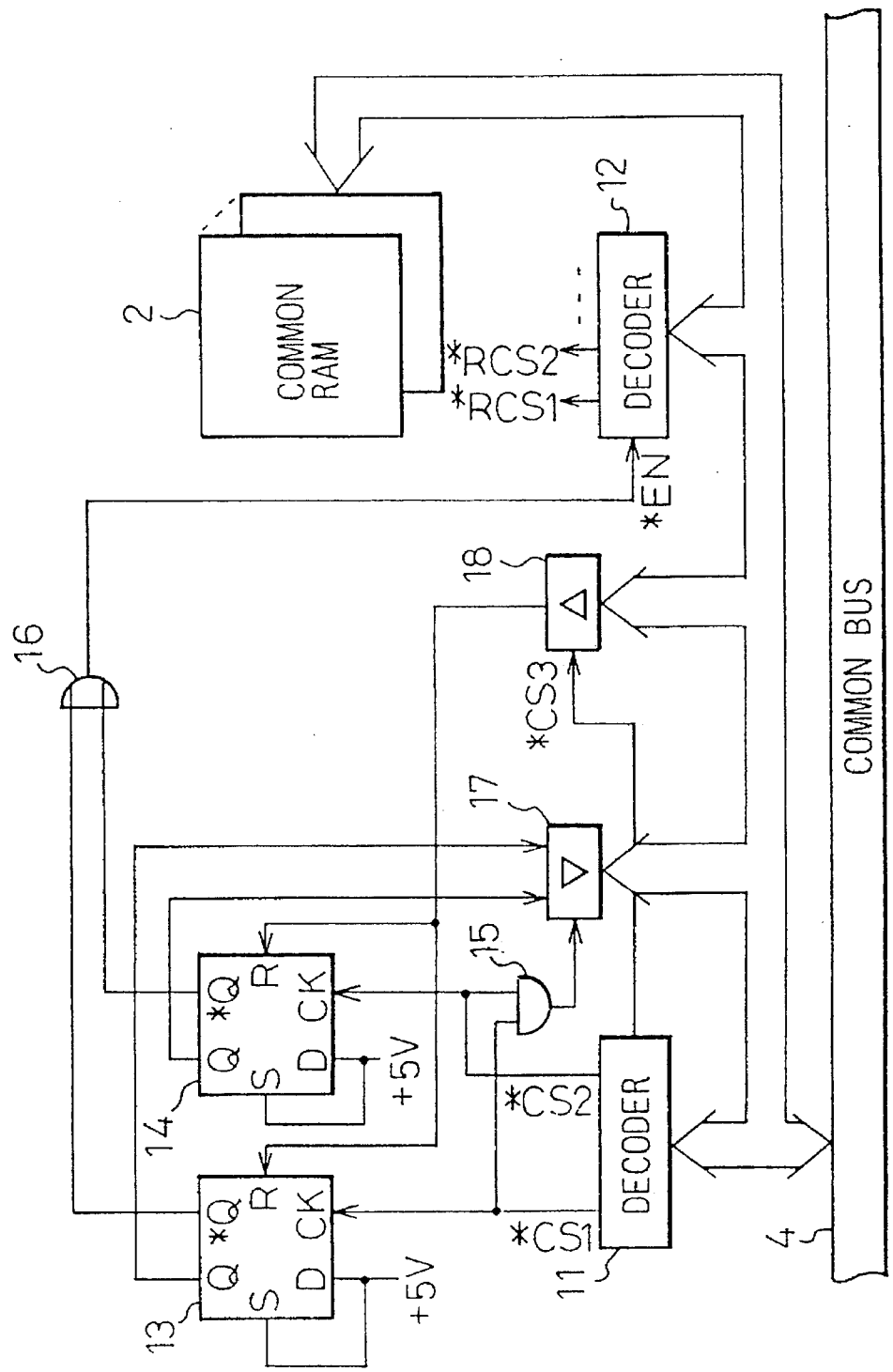
FIG. 4 is a block diagram showing the first preferred embodiment of a common memory protection system according to the present invention.

FIG. 4 shows the first preferred embodiment of a common memory protection system according to the present invention. The same components as shown FIG. 2 are provided with the same reference numerals. Reference numerals 11 and 12 indicate decoders. Reference numerals 13 and 14 indicate D type flip-flops. Reference numerals 15 and 16 respectively indicate an AND gate circuit and a OR gate circuit. Reference numerals 17 and 18 indicate buffer circuits.

The decoder 11 outputs a chip select signal 1 (*CS1) when a CPU 1 accesses 00000h via the common bus 4, and outputs a chip select signal 2 (*CS2) when a CPU 1 accesses FFFFFh via the common bus 4. If access to the common RAM 2 is allowed, the flags values provided by the buffer 17 are "00". When the CPU 1 accesses 00000h so as to read and check a semaphore-flag, the chip select signal 1 output from the decoder 11 becomes "0". Then, at the end of a memory read cycle, the chip select signal 1 becomes "1". At this time, the flip-flop 13 is set to "1". Likewise, another semaphore-flag is checked by accessing FFFFFh.

When checking both flags, an enable signal (*EN) becomes "0" and is sent to the decoder 12 via the OR gate circuit 16. Thereby, the decoder 12 is enabled. Chip select signals, i.e., *RCS1, *RCS2, ..., etc., from the decoder 12 are provided to the common RAM 2 so that the common RAM 2 is enabled.

If the value read by the decoder 11 is "1", which means that a semaphore-flag is not detected, the CPU 1 waits to access the common RAM 2.

Also, when an error occurs in any bit of an address buffer, since neither semaphore-flag is detected, the value of the enable signal provided to the decoder 12 remains "1", and thereby the decoder 12 does not output the chip select signal. Accordingly, in this case, it is impossible to access the common RAM 2.

After finishing an access to the common RAM 2, the CPU 1 outputs a specific address. Thereby, the decoder 11 outputs a chip select signal (*CS3) and the buffer circuit 18 is enabled. The CPU 1 provides a reset signal to the flip-flops 13 and 14 via the common bus 4 and the buffer 18. Consequentially, both flags become "00".

Figure 5:
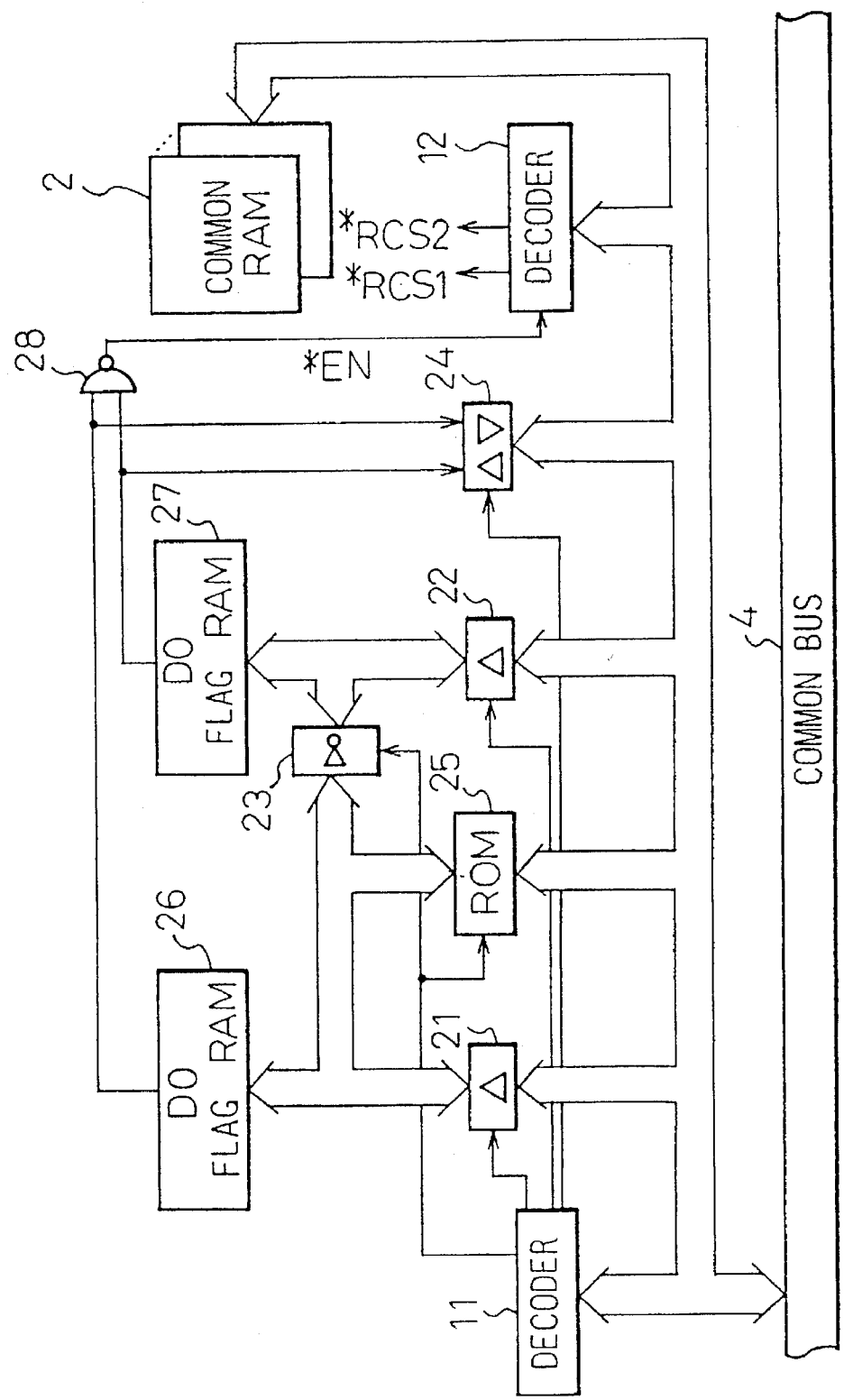
FIG. 5 is a block diagram showing the second preferred embodiment of a common memory protection system according to the present invention.

FIG. 5 shows the second preferred embodiment of a common memory protection system according to the present invention. The same components as shown FIG. 4 are provided with the same reference numerals. Reference numerals 21 and 22 indicate buffer circuits, reference numeral 23 indicates an inverting buffer circuit, and reference numeral 24 indicates a two-way buffer circuit. Reference numeral 25 indicates a read only memory (ROM) and reference numerals 26 and 27 indicate flag RAMs for storing flag data. Reference numeral 28 indicates a NAND gate circuit.

The embodiment shown in FIG. 5 is useful for a case in which the common RAM 2 is divided into a plurality of tables, and each table has two semaphore-flags. Hereafter, an explanation is given for a case where the common RAM 2 having an address area between 00000h and FFFFFh is divided into FFh tables. FIG. 6 shows the relationship between table addresses and the corresponding semaphore-flag addresses.

When generating a system by e.g., system reset, etc., the flag RAMs 26 and 27 are all cleared to "0". The CPU 1 that accesses the common RAM 2 checks the flags corresponding to a table to be read by accessing the corresponding flag addresses and by executing a read-modify-write-cycle command, e.g., "TAS", etc., so that the corresponding bits in the flag RAMs 26 and 27 are set to "1" the same as the flip-flops 14 and 13 shown in FIG. 4. After detecting the flags, the CPU 1 starts to access the table.

A segment address of the table to be accessed is sent to the ROM 25 via the common bus 4. Thereby, the ROM 25 outputs the address of a flag in the flag RAM 26, which corresponds to the table's flags, to the flag RAM 26. Likewise, the inverted signal of the ROM 25 output is provided to the flag RAM 27 via the inverting buffer circuit 23.

Accordingly, the outputs (DO) of the flag RAMs 26 and 27 designate the flag condition of a current table to be accessed. Under the access enable condition, the output values of the flag RAMs 26 and 27 are "11" so that the decoder 12 is enabled and thereby the common RAM 2 can be accessed.

However, if an error occurs in any bit of an address buffer, the corresponding flag accessed by either flag RAM 26 or 27 address is not set to "1", and the corresponding output D0 becomes "0". Thereby, the decoder 12 remains disabled so that the CPU 1 cannot access the common RAM 2, and data stored in the common RAM 2 cannot be destroyed.

Figure 7:
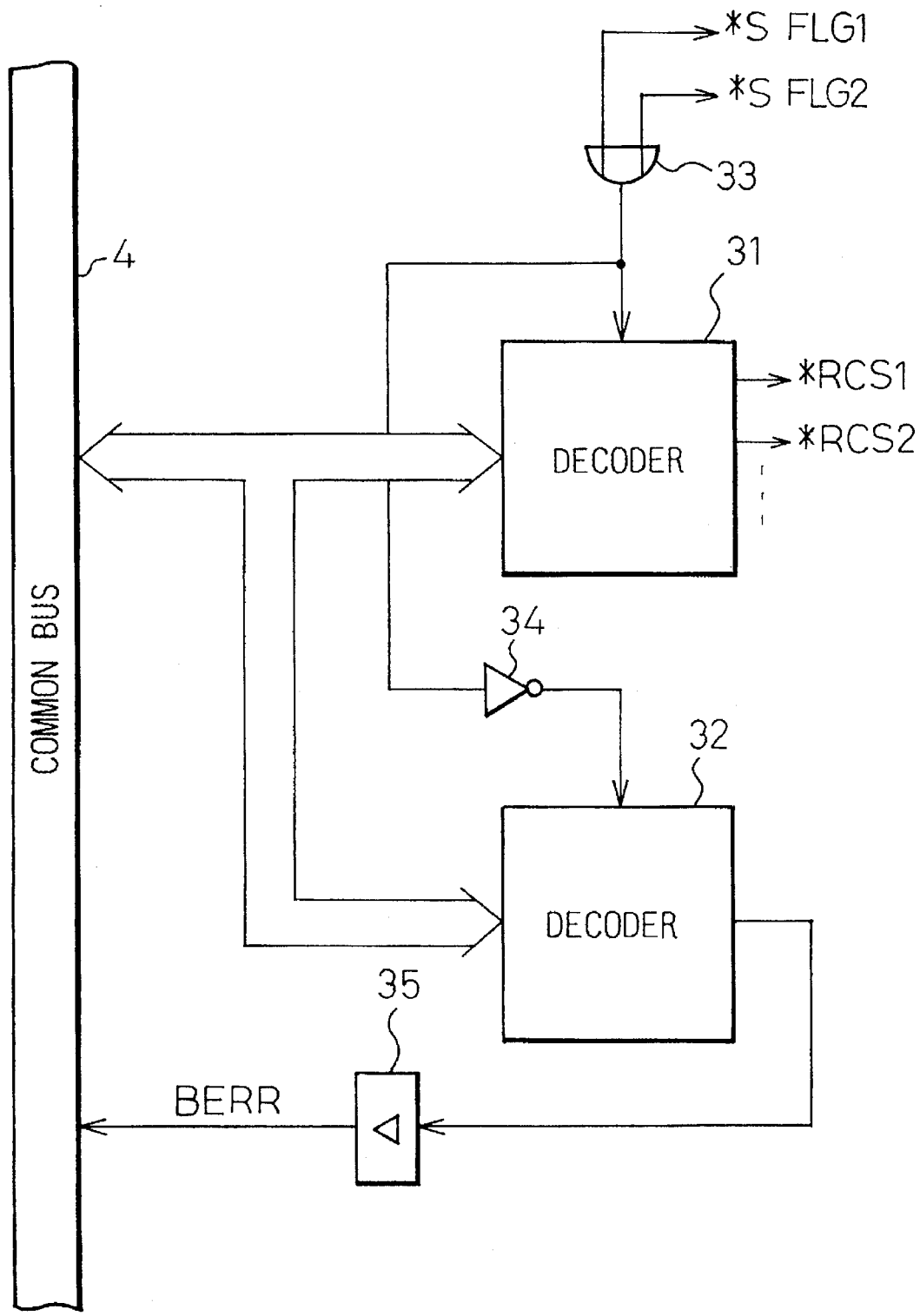
FIG. 7 is a block diagram showing the third preferred embodiment of a common memory protection system according to the present invention.

FIG. 7 shows the third preferred embodiment of a commom memory protection system according to the present invention. Reference numerals 31 and 32 indicate address decoders. Reference numeral 33 indicates an OR gate circuit, reference numeral 34 indicates an inverter, and reference numeral 35 indicates a buffer circuit.

In a flag control section (not shown in FIG. 7), by detecting a semaphore-flag (*S FLG1) and a complementary flag (*S FLG2), the decoder 31 is enabled. Thereby, the decoder 31 decodes an address provided by a commom bus 4 and outputs the chip select signals (*RCS1, *RCS2 ...) to the common RAM (not shown in FIG. 7) so that the common RAM can be accessed.

However, if both semaphore-flags are not detected, the decoder 32 instead of the decoder 31 is enabled. If the common RAM is accessed at this time, the decoder 32 sends a bus error signal (BERR) to the CPU 1 that accesses the common RAM 2 so as to notify the CPU 1 that access to the common RAM 2 is not allowed.

When detecting the bus error signal, the CPU 1 recognizes a failure in detection of semaphore-flags, and performs the corresponding error process, e.g., halts operation, etc.

Figure 8:
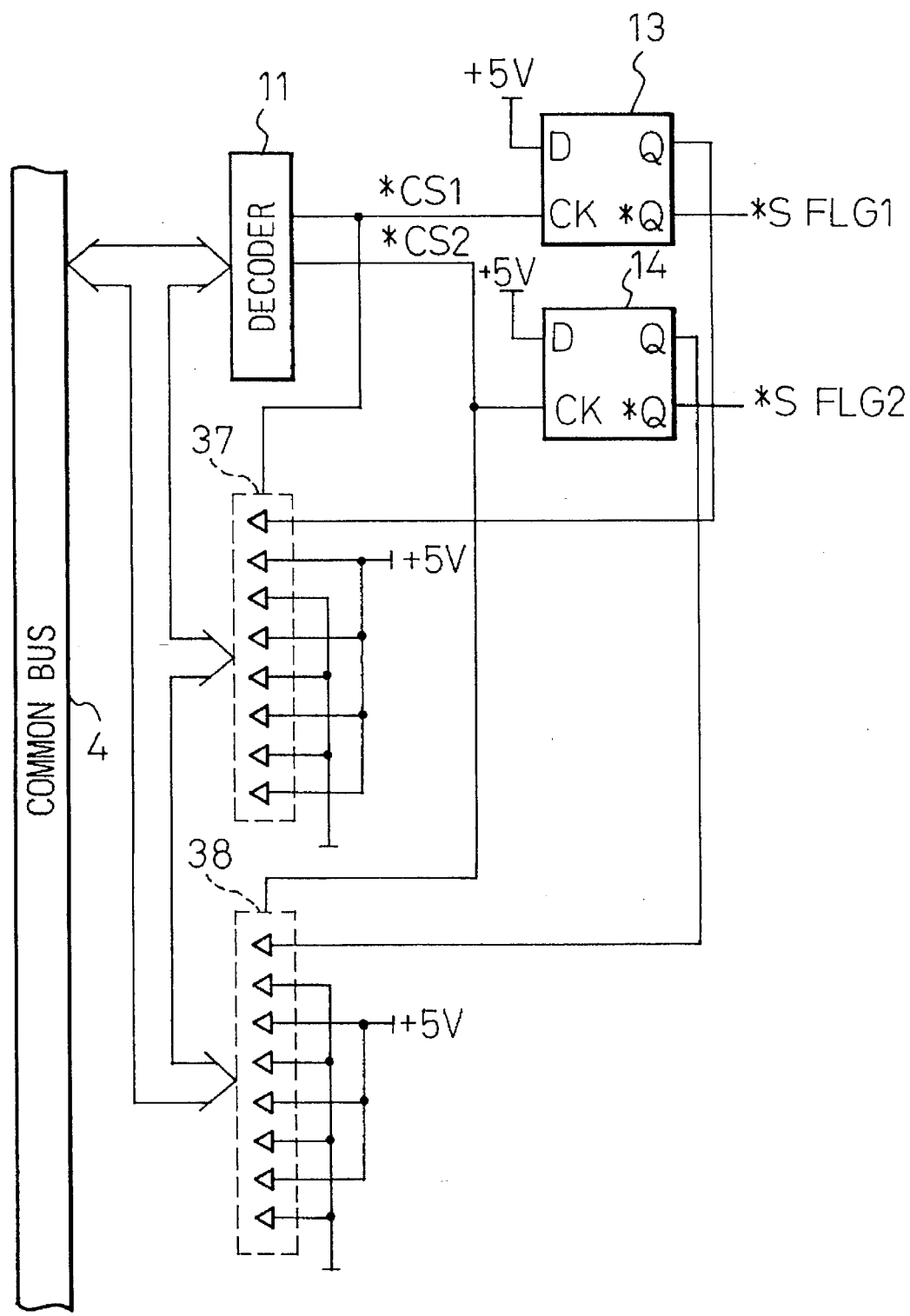
FIG. 8 is a block diagram showing the fourth preferred embodiment of a common memory protection system according to the present invention.

FIG. 8 shows the fourth preferred embodiment of a common memory protection system according to the present invention. The same components as shown in FIG. 4 are provided with the same reference numerals. Reference numerals 37 and 38 indicate registers that respectively output specific data.

In FIG. 8, the flag signal S FLG1 is provided to the register 37 and the flag signal S FLG2 is provided to the register 38. The flag signals indicate respective semaphore data. As shown in FIG. 8, the above-mentioned specific data, e.g., "X 1010101b" and "X 0101010b", herein, "X" is provided by the registers 37 and 38.

When checking the semaphore-flags, the registers 37 and 38 are enabled by the chip select signals *CS1 and *CS2. Thereby, an output signal from the register 37, which includes the flag signal *S FLG1, is read as follows.

"01010101b"→"11010101b"

Likewise, an output signal from the register 38, which includes the flag signals *S FLG2, is read as follows.

"00101010b"→"10101010b"

When an error occurs in any bit of a data bus buffer so that the error bit value is fixed, the CPU can recognizes the error by comparing the two read data that have the complementary relationship. Therefore, the CPU performs the corresponding error process, and thereby the destruction of data stored in the common RAM can be avoided.

Figure 9:
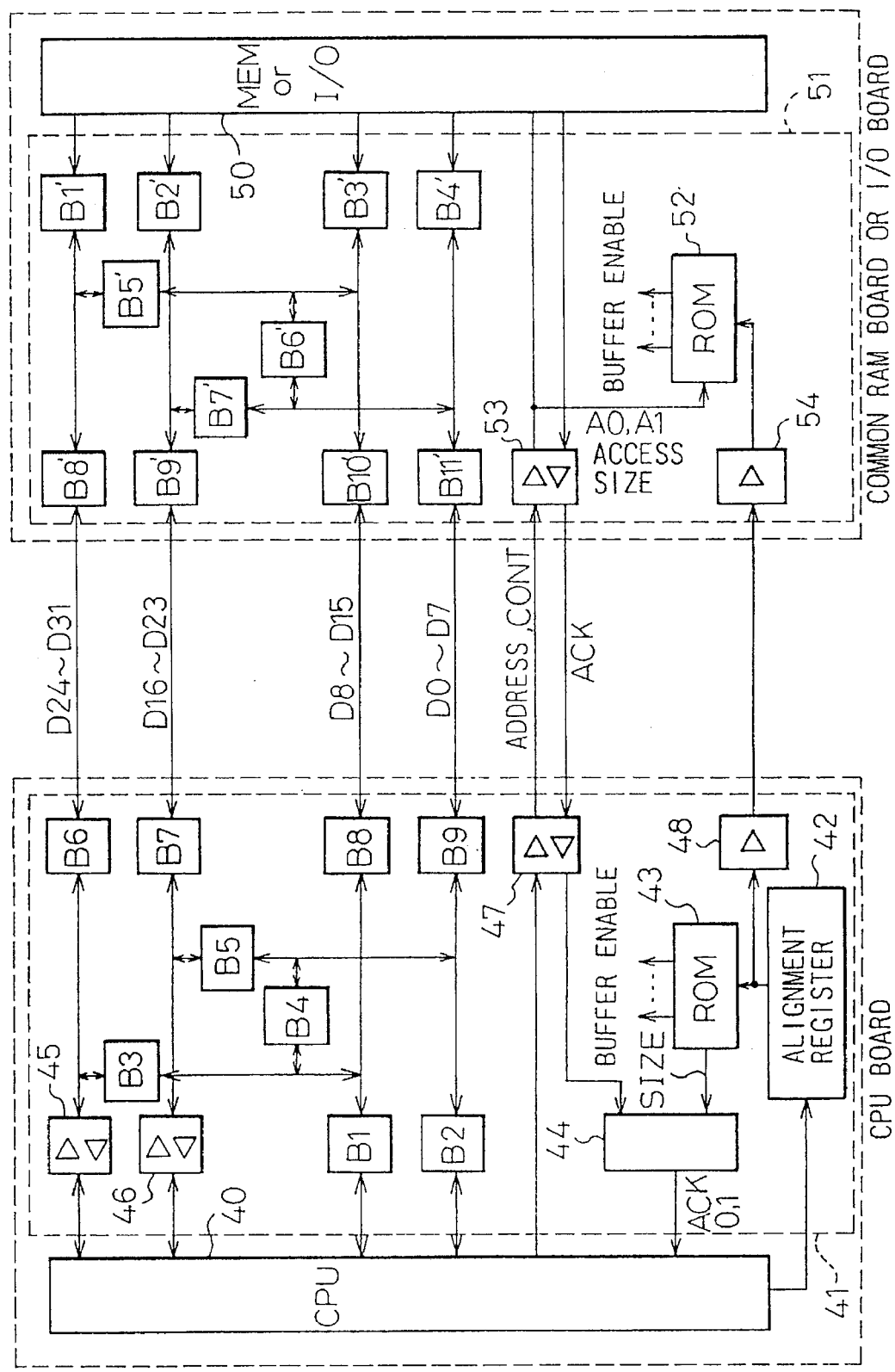
FIG. 9 is a block diagram showing the fifth preferred embodiment of a common memory protection system according to the present invention.

FIG. 9 shows the fifth preferred embodiment of a commom memory protection system according to the present invention. In this embodiment, if an error occurs in a data bus, the faulty data bus is disconnected by changing a bus connection, and thereby access to the common RAM can be recovered.

On the CPU board shown on the left side of FIG. 9, reference numeral 40 indicates a 32 bits microprocessor (CPU); and reference numeral 41 indicates an alignment changing section. In the bus alignment changing section 41, reference numeral 42 indicates an alignment register for storing error data; reference numeral 43 indicates a ROM for generating a size signal (SIZE) that indicates a bus size corresponding to the error information, and a buffer enable signal provided to each buffer circuit; and reference numeral 44 indicates an ACK producing section for producing an acknowledge signal (ACK). Reference numerals 45 to 48 and labels B1 to B9 indicate buffer circuits.

In the common RAM board or an I/O board, reference numeral 50 indicates a memory or an input/output section (MEM or I/O); and reference numeral 51 indicates an alignment changing section. In the alignment changing section 51, reference numeral 52 indicates a ROM for providing a buffer enable signal to each buffer. Reference numerals 53 and 54 and labels B1' to B11' indicate buffer circuits.

If the CPU 40 recognizes that errors simultaneously occur in data lines D24 to D31 and D8 to D15, the CPU 40 sets the error data in the alignment register 42. A size signal that assigns a 1-byte size to a system bus is then output from the ROM 43 to the ACK producing section 44. The ACK producing section 44 sends an acknowledge signal ACK 0, 1, which indicates the reception of the size signal, to the CPU 40. The common RAM or I/O section side also receives the same information from the alignment register 42.

On the CPU board, the ROM 43 outputs buffer enable signals so that the buffer circuit B1 is OFF, the buffer circuit B2 is OFF, the buffer circuit B3 is ON, the buffer circuit B4 is ON, the buffer circuit B5 is OFF, the buffer circuit B6 is OFF, the buffer circuit B7 is OFF, the buffer circuit B8 is OFF, and the buffer circuit B9 is ON. Thereby, the data lines D0 to D7 instead of the data lines D24 to D31 and D8 to D15 are assigned.

By using a control signal (CONT), the CPU 40 provides the signals A0 and A1 and the size signal, which assigns a 1-byte size to a port size, to the ROM 52 on the I/O board. Thereby, the ROM 52 outputs an enable signal that controls which 8-bit port of the 32 bit port in the memory or I/O section 50 is connected to the data lines D0 to D7.

For example, since the data lines D24 to D31 should be assigned in a case that A0="0" and A1="0" when accessed by byte, the ROM 52 outputs buffer enable signals so that the buffer circuit B1' is ON, the buffer circuit B2' is OFF, the buffer circuit B3' is OFF, the buffer circuit B4' is OFF, the buffer circuit B5' is ON, the buffer circuit B6' is ON, the buffer circuit B7' is OFF, the buffer circuit B8' is OFF, the buffer circuit B9' is OFF, the buffer circuit B10' is OFF, and the buffer circuit B11' is ON.

In a case that A0="1" and A1="0", the data lines D16 to D23 should be assigned. In this case, by buffer enable signals from the ROM 52, the buffer circuit B1' is OFF, the buffer circuit B2' is ON, the buffer circuit B3' is OFF, the buffer circuit B4' is OFF, the buffer circuit B5' is OFF, the buffer circuit B6' is OFF, the buffer circuit B7' is ON, the buffer circuit B8' is OFF, the buffer circuit B9' is OFF, the buffer circuit B10' is OFF, and the buffer circuit B11' is ON.

In a case that A0="0" and A1="1", the data lines D8 to D15 should be assigned. In this case, by buffer enable signals from the ROM 52, the buffer circuit B1' is OFF, the buffer circuit B2' is OFF, the buffer circuit B3' is ON, the buffer circuit B4' is OFF, the buffer circuit B5' is OFF, the buffer circuit B6' is ON, the buffer circuit B7' is OFF, the buffer circuit B8' is OFF, the buffer circuit B9' is OFF, the buffer circuit B10' is OFF, and the buffer circuit B11' is ON.

In a case that A0="1" and A1="1", the data lines D0 to D7 should be assigned. In this case, by buffer enable signals from the ROM 52, the buffer circuit B1' is OFF, the buffer circuit B2' is OFF, the buffer circuit B3' is OFF, the buffer circuit B4' is ON, the buffer circuit B5' is OFF, the buffer circuit B6' is OFF, the buffer circuit B7' is OFF, the buffer circuit B8' is OFF, the buffer circuit B9' is OFF, the buffer circuit B10' is OFF, and the buffer circuit B11' is ON.

Thus, it is possible to prevent the data bus error from affecting the operation of the apparatus by disconnecting a faulty bus and changing a bus alignment.

By the way, if a bus is accessed by long word or by word, the bus-sizing technique, i.e., byte-access is performed for 4 times or 2 times.

As explained above, according to the present invention, in an apparatus having a multiprocessor configuration with a common RAM, access to the common RAM is controlled by a semaphore-flag. Thus, even if an error occurs in a part of an address bus buffer on a CPU board and thereby a correct address cannot be sent to the common RAM, it is possible to prevent data stored in the common RAM from being destroyed by erroneous access by a CPU, and also to continuously perform normal operations by the remaining normal CPU board.

Further, in a case that the common RAM is divided into a plurality of tables, by providing each table with a semaphore-flag, in the same way as described above, it is possible to prevent data stored in the tables from being destroyed in every table.

Also, when detecting a wrong address by a semaphore-flag, by reception of a signal notifying such an error it is possible for a CPU to perform error process.

Furthermore, by reading and judging specific data when checking and confirming each semaphore-flag, it is possible for a CPU to recognize a data bus error and thereby perform error process.

Also, when an error occurs in an address bus buffer, by changing the bus alignment, it is possible to restore the normal access to the common RAM.

What is claimed is:

1. A common memory protection system in an apparatus having a multiprocessor configuration in which a plurality of CPUs are connected to a common RAM via a common bus, the system comprising:

a flag control section for outputting two semaphore-flag signals showing each semaphore-flag condition when said CPU checks two semaphore-flags by accessing the corresponding two semaphore-flag addresses that have the complementary address values to each other; and a memory control section that allows a CPU of a plurality of CPUs' to access any address in said common RAM via said common bus when receiving said semaphore-flag signals, both of which indicate that access to said common RAM is enabled, from said flag control section.

2. A common memory protection system as set forth in claim 1, wherein said flag control section includes a first decoder that outputs two check signals provided by decoding said two semaphore-flag addresses that have the complementary address values to each other, and two flag storage circuits each of which outputs said semaphore-flag signal at the beginning of a reception of said check signal and indicates that access to said common RAM is enabled at the end of the reception of said check signal; and said memory control section includes a second decoder that is enabled by a reception of said semaphore-flag signals, both of which indicate that access to said common RAM is enabled, from said flag control section and outputs access enable signals provided by decoding a memory address received from said CPU via said common bus, to said common RAM.

3. A common memory protection system as set forth in claim 1, wherein said common RAM is divided into a plurality of tables each of which has said two semaphore-flags accessed by said semaphore-flags addresses having complementary address values to each other and corresponding to respective segment addresses of said tables;

said flag control section includes a first decoder that outputs two check addresses provided by decoding said two semaphore-flag addresses that have complementary address values to each other and correspond to respective segment addresses of said tables, and two flag RAMs each of which outputs said semaphore-flag signals corresponding to each table at the beginning of an input of said check address and indicates that access to each table in said common RAM is enabled at the end of the input of said check address; and said memory control section includes a second decoder that is enabled by said semaphore-flag signals, both of which indicate that access to each table in said common RAM is enabled, from said flag RAMs and outputs access enable signals to said tables in said common RAM by decoding a memory address received from said CPU via said common bus.

4. A common memory protection system as set forth in claim 1, wherein said memory control section further includes a third decoder that outputs an error signal when said CPUs access said common RAM without detection of said semaphore-flag signals, both of which indicate that access to said common RAM is enabled, from said flag control section, and by reception of said error signal said CPUs activate an exception process and halt their operation.

5. A common memory protection system as set forth in claim 1, wherein said flag control section outputs said two semaphore-flag signals further having respective specific data that have complementary values to each other so as to check for a data bus error.

6. A common memory protection system as set forth in claim 1, further having an alignment changing section that changes the bus alignment between said CPUs and said common RAM or I/O section when a problem occurs in said common bus.

* * * * *